(12) United States Patent
Kumar (10) Patent No.: US 8,248,546 B2
(45) Date of Patent: Aug. 21, 2012

(54) ELECTRONIC BLIND AND METHOD FOR MANUFACTURING ELECTRONIC BLIND

(75) Inventor: Rajesh Kumar, Fukuoka (JP)

(73) Assignees: Vision Multimedia Technology Ltd., Fukuoka (JP); K&I Display Corporation, Gyeonggi-Do (KR)

( * ) Notice: Subject to any disclaimer, the term of this patent is extended or adjusted under 35 U.S.C. 154(b) by 714 days.

(21) Appl. No.: 12/227,446

(22) PCT Filed: May 22, 2007

(86) PCT No.: PCT/JP2007/060446
§ 371 (c)(1),
(2), (4) Date: Apr. 27, 2009

(87) PCT Pub. No.: WO2007/136063
PCT Pub. Date: Nov. 29, 2007

(65) Prior Publication Data
US 2009/0303402 A1    Dec. 10, 2009

(30) Foreign Application Priority Data
May 22, 2006 (JP) .................................. 2006-141634

(51) Int. Cl.
*G02F 1/1335* (2006.01)
*G02F 1/1343* (2006.01)

(52) U.S. Cl. .......................................... 349/16; 349/139

(58) Field of Classification Search .............. 349/86–88, 349/1, 16, 139
See application file for complete search history.

(56) References Cited

U.S. PATENT DOCUMENTS

| 5,694,188 | A | * | 12/1997 | Sano et al. ..................... 349/139 |
| 6,469,765 | B1 | * | 10/2002 | Matsuyama et al. ........... 349/143 |
| 7,995,181 | B2 | * | 8/2011 | Choi et al. ..................... 349/143 |
| 2005/0092966 | A1 | * | 5/2005 | Heckmeier et al. ...... 252/299.63 |

FOREIGN PATENT DOCUMENTS

| JP | 61-171029 | 10/1986 |
| JP | 6-17582 | 1/1994 |
| JP | 6-273725 | 9/1994 |
| JP | 7-239465 | 9/1995 |
| JP | 8-184273 | 7/1996 |
| JP | 9-221967 | 8/1997 |

* cited by examiner

*Primary Examiner* — Dung T Nguyen
(74) *Attorney, Agent, or Firm* — Jordan and Hamburg LLP

(57) ABSTRACT

An electronic blind and method for manufacturing an electronic blind, for whole or partial area light control management includes a pair of substrates, polymer/liquid crystal composite material sandwiched between the pair of substrates, and a pair of electrodes formed on an opposing surface of the pair of substrates. One electrode of the pair of electrodes is patterned over one substrate in line form at intervals from one side to the other side of the substrate, and an other electrode of the pair of electrodes is formed over the entire surface of another substrate.

12 Claims, 6 Drawing Sheets

ELECTRONIC BLIND AND METHOD FOR MANUFACTURING ELECTRONIC BLIND

BACKGROUND OF THE INVENTION

This invention discloses an electronic blind and method for manufacturing the electronic blind. More particularly, the invention discloses an electronic blind and a method for manufacturing the electronic blind, for whole or partial area light control management of a window, etc., of a building.

Figure 6:
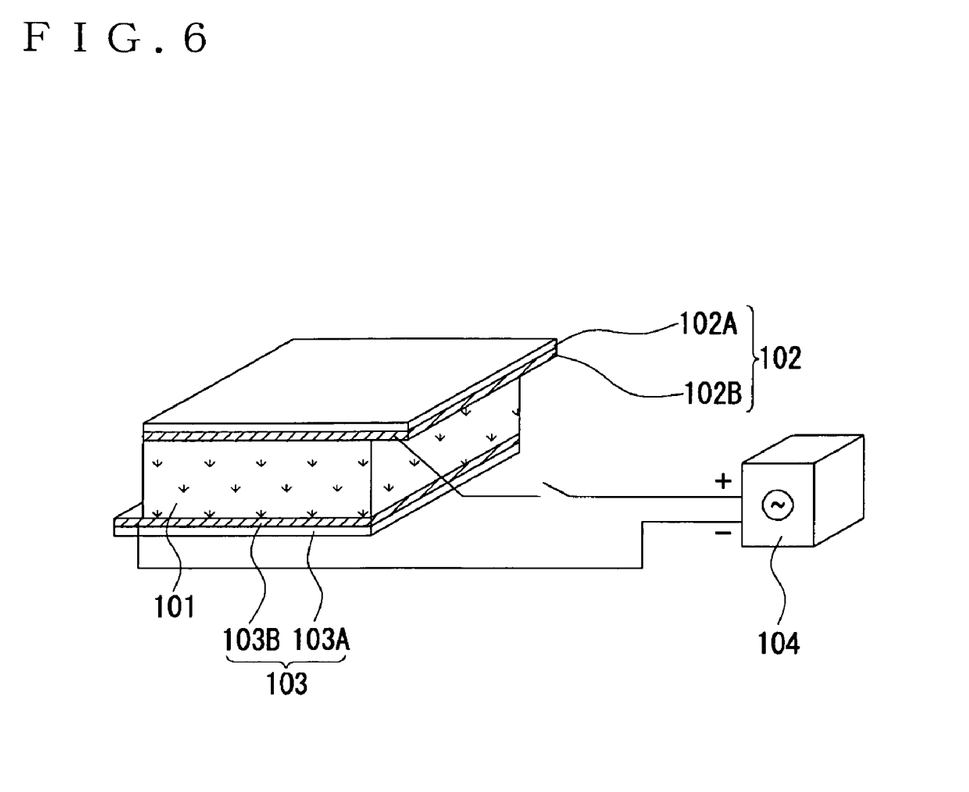
FIG. 6 is a schematic diagram of an existing liquid crystal panel.

Usually, a liquid crystal panel is fabricated by sandwiching polymer/liquid crystal composite material having polymer domains and liquid crystal domain between a pair of transparent plastic substrates (referred to as substrate), where an opposite inward surface of substrates are coated with a transparent electrically conductive film of indium tin oxide (ITO). Normally, the polymer/liquid crystal composite material is coated on a substrate, irradiated by UV light and sandwiched between a pair of substrates to form a phase separated milky white state. When a certain voltage of an AC field is applied across the substrates, the polymer/liquid crystal composite material is influenced by the applied voltage and the liquid crystals rotate and align along the field to allow the light to pass, as being transparent. When AC voltage is off, light does not pass, thereby returning to an opaque state. Various types of liquid crystal panels as mentioned above are suggested (for example, Japanese patent document JP5-45634(A)). FIG. 6 is the schematic diagram of an existing liquid crystal panel. In FIG. 6, a phase separated polymer/liquid crystal composite layer 101 consists of two types of polymer materials and liquid crystal material, confined between transparent electrodes 102 and 103 of the liquid crystal panel. Transparent electrodes 102 and 103 are made of transparent conducting layers 102B and 103B over respective base transparent films 102A and 103A. Each transparent conducting layer 102B and 103B is in contact with polymer/liquid crystal composite layer 101. When, AC voltage 104 is applied across transparent electrodes 102 and 103, light passes through polymer/liquid crystal composite layer 101, and when AC voltage is off, light does not pass through.

The aforementioned liquid crystal panel can control the light over the whole area only, having a uniform transparent electrode. However, light control over a partial area, moreover in slat form, has heretofore not been available.

Also, liquid crystal panels, each with a transparent electrode placed adjacent between upper and lower substrates, could be thought to be off, however, polymer/liquid crystal composite in the liquid crystal panel is required to be sealed using sealing material. In this case, electrical connection technique becomes complex, cost involving and production of finished product becomes expensive. Apart from that, sealing space between adjacent liquid crystal panels becomes wide, making the opaque area larger between liquid crystal panels.

The present invention addresses all the above mentioned issues involved so far. The purpose of the present invention is to disclose an electronic blind and a method for manufacturing the electronic blind for light control management over a whole or partial area.

SUMMARY OF THE INVENTION

In accordance with an embodiment of the invention, the disclosed electronic blind is comprised of a pair of substrates, polymer/liquid crystal composite material sandwich between said pair of substrates and a pair of electrodes for the electronic blind. Out of the pair of electrodes, one electrode is patterned from one side to the other side of the substrate in line form at intervals, while another electrode is formed uniformly over another substrate.

Since, one substrate has the patterned electrode from one side of the substrate to the other side of substrate in line form at intervals, voltage can be applied over a partial area. Also, since one substrate has the patterned electrode and another substrate has the uniform electrode, there is no need to adjust the upper and lower opposite electrodes.

Also, in accordance with the electronic blind as disclosed in this invention, the scattering zone becomes thin, and whole area looks transparent, when a patterned line electrode width is 0.66 mm or less, or 0.2 mm or less.

Also, in accordance with the electronic blind as disclosed in the embodiment, the polymer/liquid crystal composite material is comprised of 2-Ethyl hexyl acrylate, 1-6-Hexadianol di acrylate, oligomer & poly-acrylate mixture or at least one of these in the composition and the rest is the liquid crystal. 2-Ethyl hexyl acrylate in composition leads to the low voltage drive of the electronic blind and 1-6 Hexadianol di acrylate leads to fast response time, while an oligomer and poly-acrylate mixture, or at least one of these, could increase the viscosity of polymer/liquid crystal composition.

To achieve the objective of invention, the manufacturing process of the electronic blind comprises forming electrodes on the surface of a pair of substrates, sandwiching the polymer/liquid crystal composite for manufacturing the electronic blind by placing the polymer/liquid crystal material between the pair of substrates, forming a pair of electrodes on the opposite surface of a pair of substrates where one electrode is patterned from one side to the other side of the substrate in line form at intervals, while an other electrode is formed uniformly over another substrate.

An electronic blind, where voltage can be applied over a partial area, can be manufactured by a process of patterning electrode at intervals from one side of the substrate to the other side of substrate in line form. Also, by a process of forming a uniform electrode over the other substrate, an electronic blind that does not require adjustment of upper and lower opposite electrodes can be manufactured.

Also, in accordance with the manufacturing process for an electronic blind as disclosed in this invention, the scattering zone becomes thin, and the whole area looks transparent when the patterned electrode is formed at an interval 0.66 mm or less, or 0.2 mm or less.

According to an embodiment of a manufacturing process of the electronic blind as disclosed, the polymer/liquid crystal composite material is composed of 2-Ethyl hexyl acrylate, 1-6 Hexadianol di acrylate, oligomer & poly-acrylate mixture or at least one of them in the composition and the rest is the liquid crystal. 2-Ethyl Hexyl Acrylate in the composition leads to low voltage operation of electronic blind and 1-6 Hexadianol Di Acrylate leads to the fast response time, while oligomer & poly-acrylate mixture or at least one of them could increase the viscosity of polymer/liquid crystal composition.

The electronic blind as disclosed in the present invention can control the light over a whole area or selective partial area.

The method of manufacturing the electronic blind as disclosed in the present invention enables the fabrication of an electronic blind that can control the passage of light over a whole area or a selective partial area.

DETAILED DESCRIPTION OF THE INVENTION

As mentioned below, using the description of figures, the details of the invention are described as follows. The light control using a patterned electrode, as well as an electronic blind and a manufacturing process of the electronic blind, that can be used for architecture building materials and automotive application, are described.

The material for the substrate (film substrate), which could be used for the electronic blind as disclosed in the invention, could be polyethylene terephthalate (PET film), polyethylene naphthalate (PEN film) or film like polycarbonate (PC). The substrate films as mentioned above are coated with indium tin oxide (ITO) to form clear transparent conducting electrode layer.

Next, in the polymer/liquid crystal composition used for the electronic blind as disclosed in the invention, a spacer, as micro-spheres, is mixed in a certain ratio so as to fix the uniform thickness of the polymer/liquid crystal composition. Later, polymer/liquid crystal composition could be coated on the substrate using multi-coating or curtain coating or screen-printing. Next, a boundary of the substrate is sealed using sealing material to prevent the entry of oxygen and moisture that can cause degradation of polymer/liquid crystal composite and UV irradiation is done to cure the monomers to form the phase separated composite film.

Polymer/liquid crystal composition used for the electronic blind as disclosed in the invention, is composed of mixture of acrylate monomers, while oligomer or poly-acrylate mixture could increase the viscosity of polymer/liquid crystal composition. Moreover, for speed up the rate of polymerization a photo-curing initiator such as 2-dimethoxy-2-phenyl acetophenone is added to the composition.

The liquid crystal used for the electronic blind as disclosed in the invention is a mixture of biphenyl, cyclohexane and fluorine-containing liquid crystal. A mixture of liquid crystals has been chosen taking care of temperature range as well as birefringence and viscosity in consideration. The low birefringence liquid crystal ($\Delta n=0.18$) in polymer/liquid crystal composition is chosen purposefully to tailor the desired properties such as low haze. Since, the liquid crystal used dissolves in the monomer which forms a clear solution in homogeneity, the viscosity of the homogeneous mixture of liquid crystal and monomers has been fixed in range of 50 to 250 Cps (50 to 250 mPa·s) taking care of roll to sheet coating process on plastic film. When liquid crystal viscosity is less than 50 mPa·s, the adhesion to the substrate is weak and easy to peel off making it not suitable while in case of liquid crystal viscosity more than 250 mPa·s, liquid crystal becomes too viscous and is not suitable to use.

In the polymer/liquid crystal composition, the ratio of liquid crystal is 70 to 82 weight % and pre-polymer ratio is 30 to 18 weight %. If the ratio of liquid crystal is large in the composition, lower drive voltage but low contrast results, whereas an increase in ratio of pre-polymers in composition leads to higher driving voltage, higher haze and low viscosity.

The pre-polymer composition is a mixture of mono acrylate, diacrylate and polyacrylate or oligimers or at least one of them, and their ratio in the pre-polymer composition influences the electro-optical performance of the composite. Increase in a ratio of mono-acrylate in the composition leads to low drive voltage, whereas increasing the ratio of diacrylate leads to higher driving voltage and fast switching time. Monoacrylate & oligomer influence the viscosity of the polymer/liquid crystal composition. The addition of poly-acrylate or oligomers in the composition leads in increase of viscosity.

Polymer/liquid crystal composite as disclosed in this invention is a mixture of acrylate monomers and oligomer where viscosity of polymer/liquid crystal composition could be tailored as desired. Also, polymer/liquid crystal composite as disclosed in this invention has the following merits such as low price, high contrast and low haze.

EXAMPLE 1

An example is described below for more specific description of the polymer/liquid crystal composite. The total weight percent of the polymer/liquid crystal composition is comprised of 2 ethyl hexyl acrylate (Aldrich Co., Ltd.) 6 weight % and M-1210 (product name, acrylate oligomer, Toagosei Co., Ltd) 12.0 weight % and 1-6 hexadianol di acrylate (Aldrich Co., Ltd.) 2.0 weight % and liquid crystal TEB 50 (product name, Shijiazhuang Slichem Liquid Crystal Materials Co. Ltd.) 80.0 weight %. Next, 2-dimethoxy-2-phenyl acetophenone a photo-initiator 5 weight % was added to the composition respective to the total weight fraction of monomers 2-ethyl hexyl acrylate, M-1210 and 1-6 hexadianol di acrylate. Polymer/liquid crystal composition was coated on a transparent conducting glass substrate and covered with another transparent conducting glass substrate so as to keep a polymer/liquid crystal composite thickness 16 mm. Next, a test cell of thickness 16 mm was prepared by curing the polymer/liquid crystal composite by UV irradiation at 30 mW/cm$^2$ over the substrate for 30 sec. at 20° C. (degree centigrade). The electro-optical properties of the polymer/liquid crystal composite material measured at 25° C. (degree centigrade) are shown as Example 1 in Table 1.

EXAMPLE 2

An example is described below for a more specific description of the polymer/liquid crystal composite. The total weight percent of the polymer/liquid crystal composition is comprised of 2 ethyl hexyl acrylate (Aldrich Co., Ltd.) 6 weight % and M-1210 (product name, Acrylate Oligomer, Toagosei Co., Ltd) 12.0 weight % and 1-6 hexadianol di acrylate (Aldrich Co., Ltd.) 2.0 weight % and liquid crystal TEB-300 (product name, birefringence 0.18, Shijiazhuang Slichem Liquid Crystal Materials Co. Ltd.). 80.0 weight %. A 5 weight % 2-dimethoxy-2-phenyl acetophenone (a photo-initiator) was added to the composition respective to the total weight fraction of monomers 2 ethyl hexyl acrylate, M-1210 and 1-6 hexadianol di acrylate. Next, a test cell of thickness 16 mm was prepared by curing the polymer/liquid crystal composite by UV irradiation at 30 mW/cm$^2$ over the substrate for 30 sec. at 20° C. (degree centigrade). The electro-optical properties of the polymer/liquid crystal composite material measured at 25° C. (degree centigrade) are shown as Example 2 in Table 1.

TABLE 1

|  | Example 1 | Example 2 |
|---|---|---|
| Transmittance (Voltage off) (%) | 0.89 | 1.25 |
| Transmittance (Voltage on) (%) | 86.54 | 86.00 |
| Voltage at Transmittance 10% (V) | 6.1 | 5.9 |
| Voltage at Transmittance 90% (V) | 10.8 | 10.6 |
| Hystersis (V) | 1.5 | 1.6 |
| Rise Time (ms) | 0.39 | 0.43 |
| Decay Time (ms) | 14.87 | 44.92 |
| Viscosity (at 20° C.) (mPa · s) | 68 | 210 |

Figure 1:
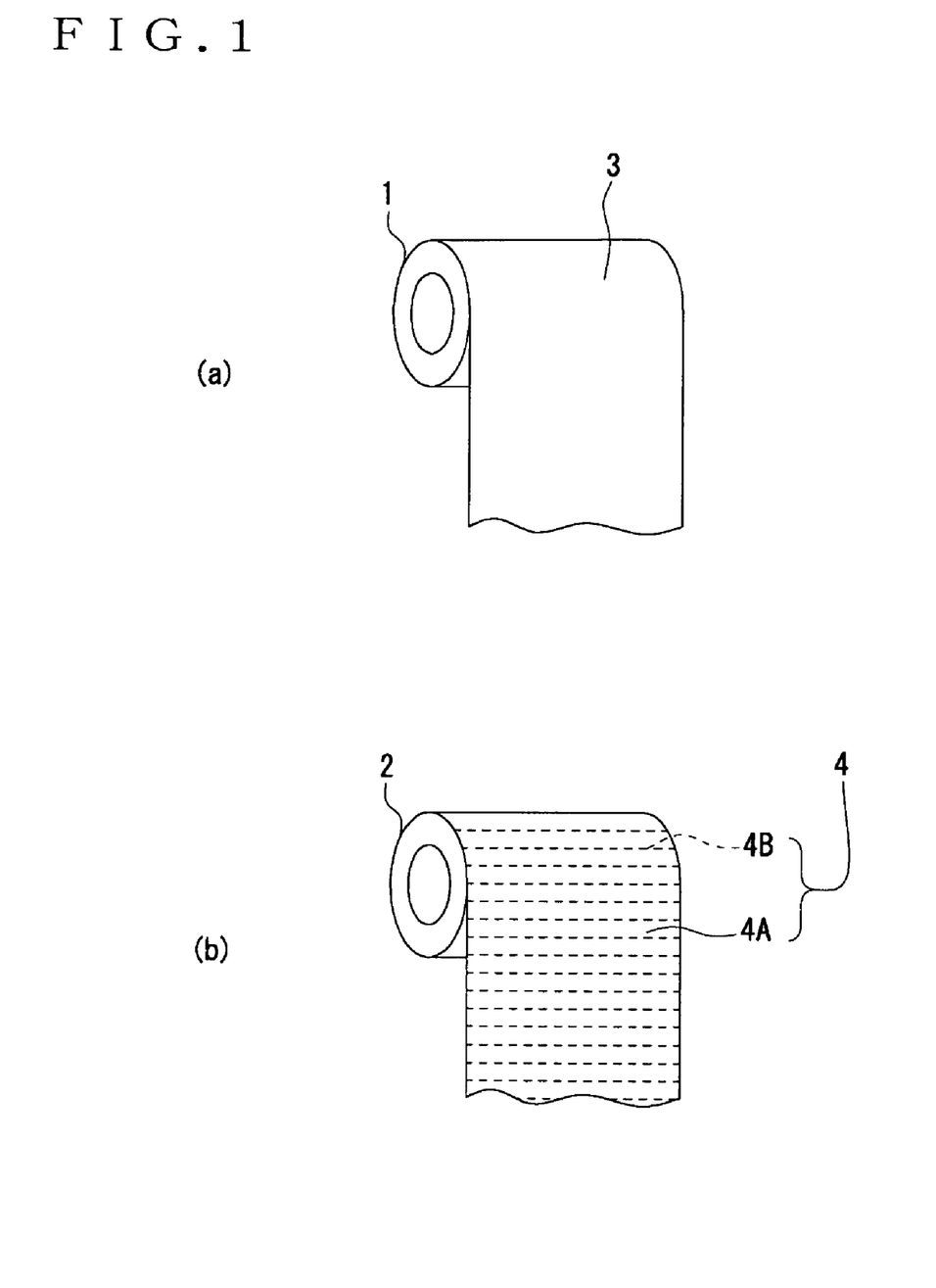
FIG. 1(a) shows Polyethylene terephthalate (ITO-PET) film with uniform film of ITO on one surface.
FIG. 1(b) shows the roll of ITO-PET film with horizontal pattern of ITO from one side to the other side in line form separated from each other at intervals.

FIG. 1(a) shows Polyethylene terephthalate (ITO-PET) film with a uniform film of ITO on one surface. FIG. 1(b) shows the roll of ITO-PET film with a horizontal pattern of ITO from one side to the other side in line form separated from each other at intervals.

As shown in FIG. 1(a) the transparent conductive electrode layer 3 is uniform film of ITO formed over one surface of 1st film substrate 1 that is made of PET film. As shown in FIG. 1(b), electrode 4 is an ITO layer pattern along the width over the 2nd film substrate 2 where 4A is the ITO layer and 4B is space without the ITO layer. The electrode 4 over the 2nd film substrate 2 mentioned above could be used in place manufactured by Tobi Co., Ltd. where ITO layer 4A has a width space 40 mm and without ITO layer 4B has width space 0.5 mm. Also ITO layer 4A is separated at interval by without the ITO layer space.

In the case of an ITO layer patterned at certain intervals, the ITO layer width is not necessary to be 40 mm, also without the ITO space width may not be exact 0.5 mm, but it could be 0.66 mm or less, or 0.2 mm or less, or even 0.3 mm is also feasible. Also, In case of an ITO layer patterned at certain intervals, the patterning could be done along the width of 2nd substrate or along the length of 2nd substrate.

The thickness of 1st film substrate or 2nd film substrate is usually 125 mm, however it could be chosen as 175 mm or 188 mm depending on the ITO coating process.

Figure 2:
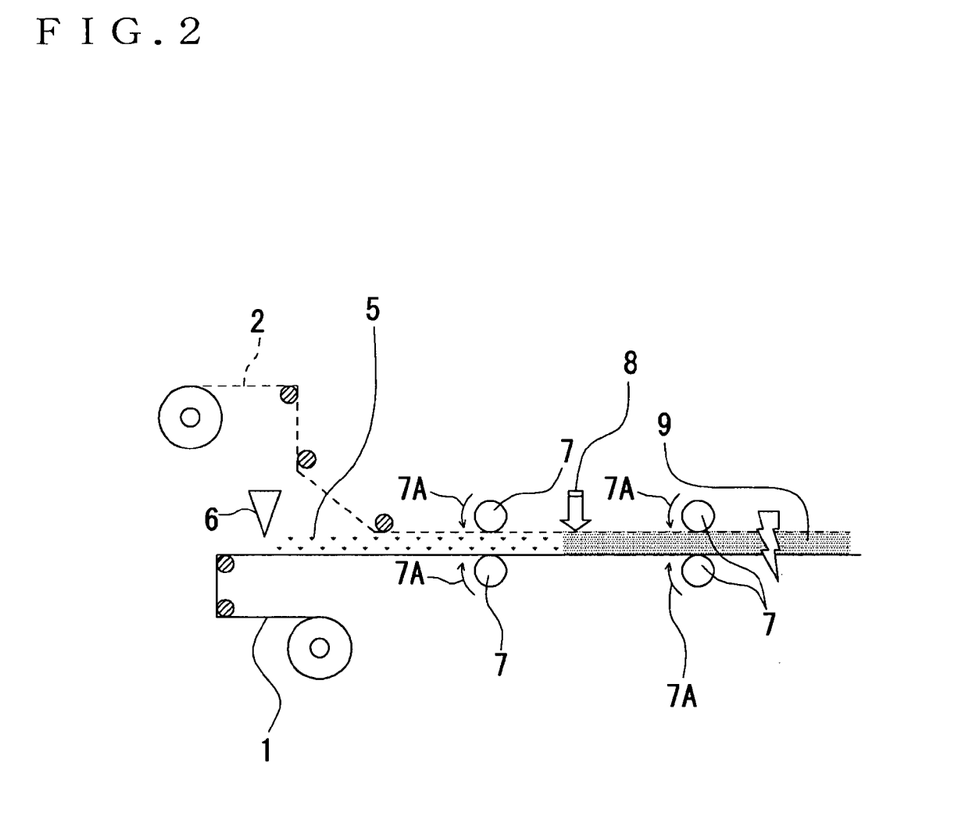
FIG. 2 shows the example of manufacturing process of electronic blind panel by roll to sheet coating process.

FIG. 2 shows the schematic of an example of a manufacturing process of the electronic blind panel by a roll to sheet process. The 1st film substrate having a uniform transparent electrode made of an ITO layer on its one surface and the 2nd film substrate having a transparent electrode on its one surface with interval of the ITO layer separated by space without the ITO layer are unwound from their respective rolls. Also, micro-sphere called as a spacer is mixed with polymer/liquid crystal composition 5 to maintain the uniform thickness of the composition throughout.

Next, regarding coating process 6, polymer/liquid crystal composite material 5 is coated over the 1st film substrate having uniform transparent electrode made of an ITO layer on its one surface. Next, polymer/liquid crystal composite 5 is laminated by the 2nd substrate with the electrode surface facing the polymer/liquid crystal composite material. Thus, using the unwinding direction 7A of roller 7, polymer/liquid crystal composite 5 is laminated within 1st film substrate 1 and 2nd film substrate 2. Next at 25° C. (degree centigrade), 30 mW/cm$^2$ for 30 sec. UV curing process 8 is performed over the laminated structure.

The UV exposed laminated structure, having phase separated polymer/liquid crystal composite 5 inside, is cut into segments. The perimeter of the cut segment is sealed using sealant to protect the polymer/liquid crystal composite 5 and thus the electronic blind panel 9 is fabricated.

Figure 3:
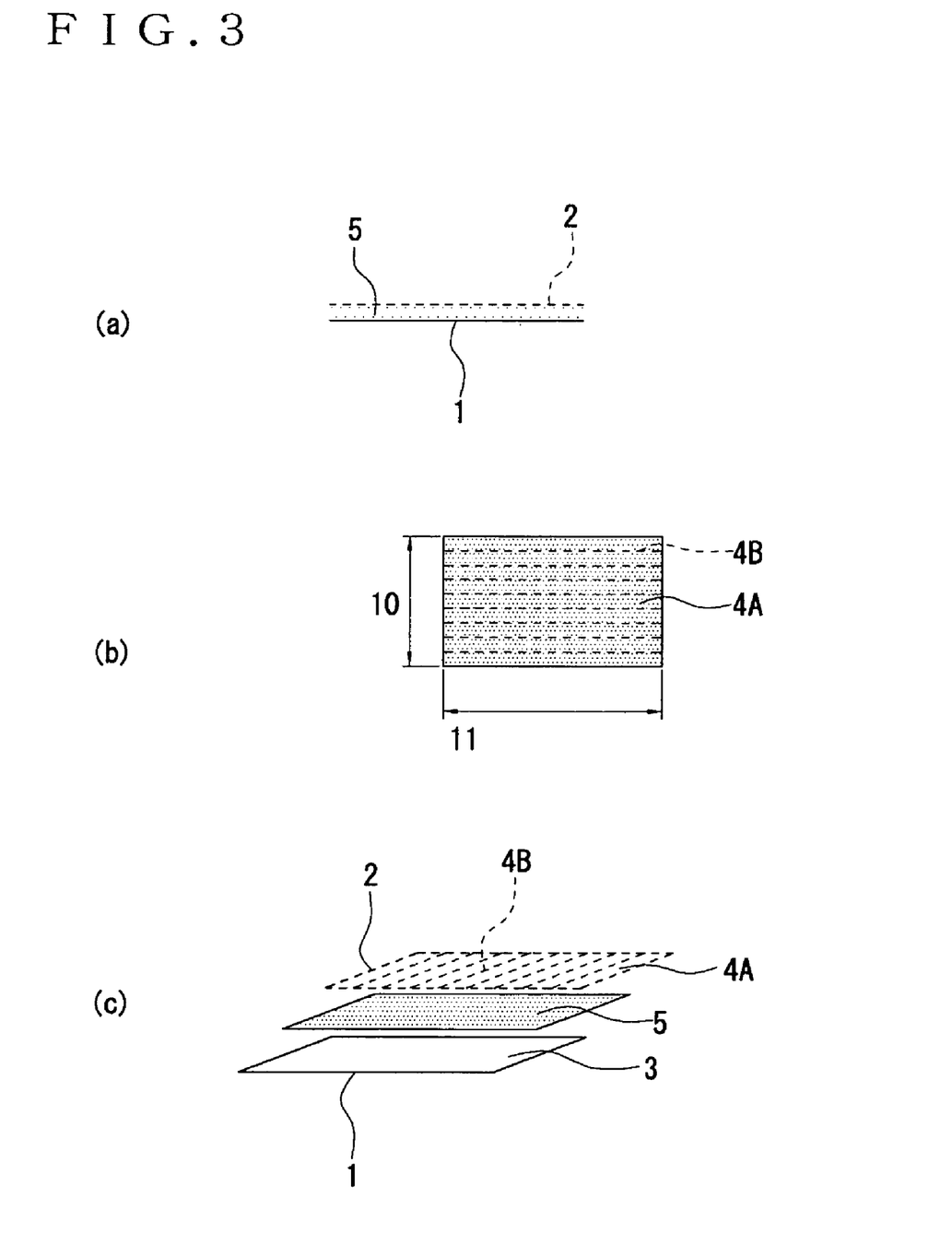
FIG. 3(a) shows the side view of electronic blind panel.
FIG. 3(b) shows the front view of electronic blind panel.
FIG. 3(c) shows the cross sectional view of electronic blind panel.

FIG. 3(a) shows the side view of an electronic blind panel. FIG. 3(b) shows the front view of electronic blind panel. FIG. 3(c) shows the cross sectional view of electronic blind panel. In FIG. 3(a) to FIG. 3(c) polymer/liquid crystal composite material 5 is sandwiched between 1st film substrate 1 and 2nd film substrate 2 and the perimeter is sealed using sealant to protect the polymer/liquid crystal composite 5. The polymer/liquid crystal composite 5 is milky white. The 2nd film substrate 2 has ITO layer 4A having a width of 40 mm at the interval of 0.5 mm (layer without ITO 4B where space width is 0.5 mm). The length 10 of the electronic blind panel could be customized according to purpose. The width of the electronic blind 11, as shown in FIG. 3 (b), is 600 mm. However, this width is not limited, and it could be of custom length according to purpose.

Figure 4:
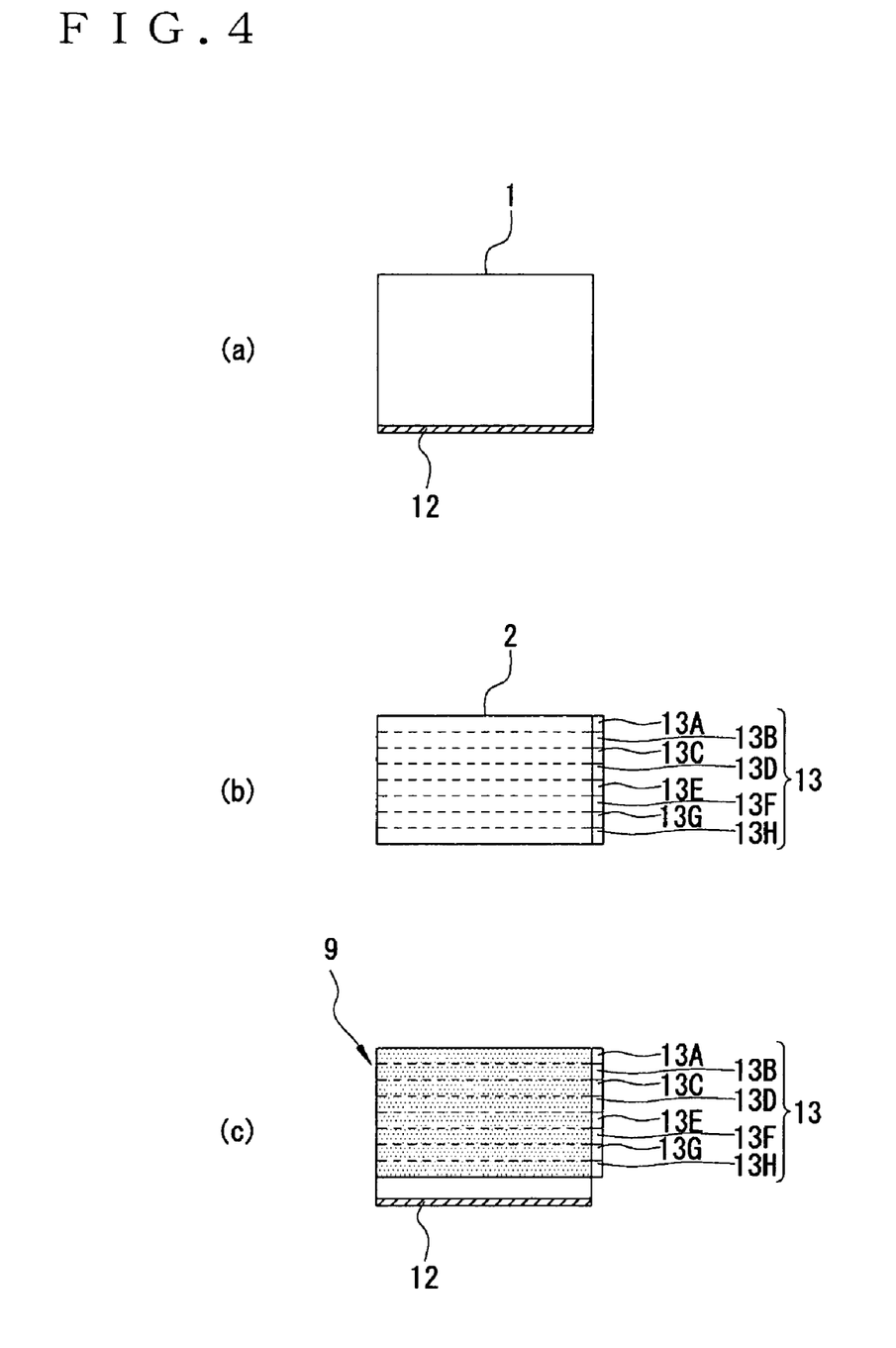
FIG. 4(a) shows the schematic of contact electrode for 1st substrate.
FIG. 4(b) shows the schematic for individual segment contact ITO electrode for patterned 2nd substrate.
FIG. 4(c) shows the schematic of electronic blind made from 1st film substrate with contact electrode & 2nd film substrate with each ITO layer has contact electrode.

FIG. 4(a) shows the schematic of an example of a contact electrode for a 1st substrate. FIG. 4(b) shows the schematic for contact electrode for individual segments of ITO patterned 2nd substrate. FIG. 4(c) shows the schematic of fabrication of electronic blind made from a 1st film substrate with a contact electrode and a 2nd film substrate with a contact electrode for individual ITO layer segments.

In FIG. 4(a) copper foil contact electrode 12 is press laminated over an offset area of the 1st film substrate having uniform layer transparent conductive ITO layer electrode on its one surface.

Similarly, as shown in FIG. 4(b), eight copper foil contact electrodes 13 (13A to 13H) are press laminated over the offset area. FIG. 4(c) is the schematic of the electronic blind with polymer/liquid crystal composite in a milky white state, where copper foil contact electrode 12 of 1st film substrate and contact electrode 13 (13A to 13H) of 2nd film substrate of electronic blind panel 9 are made cross to each other.

Figure 5:
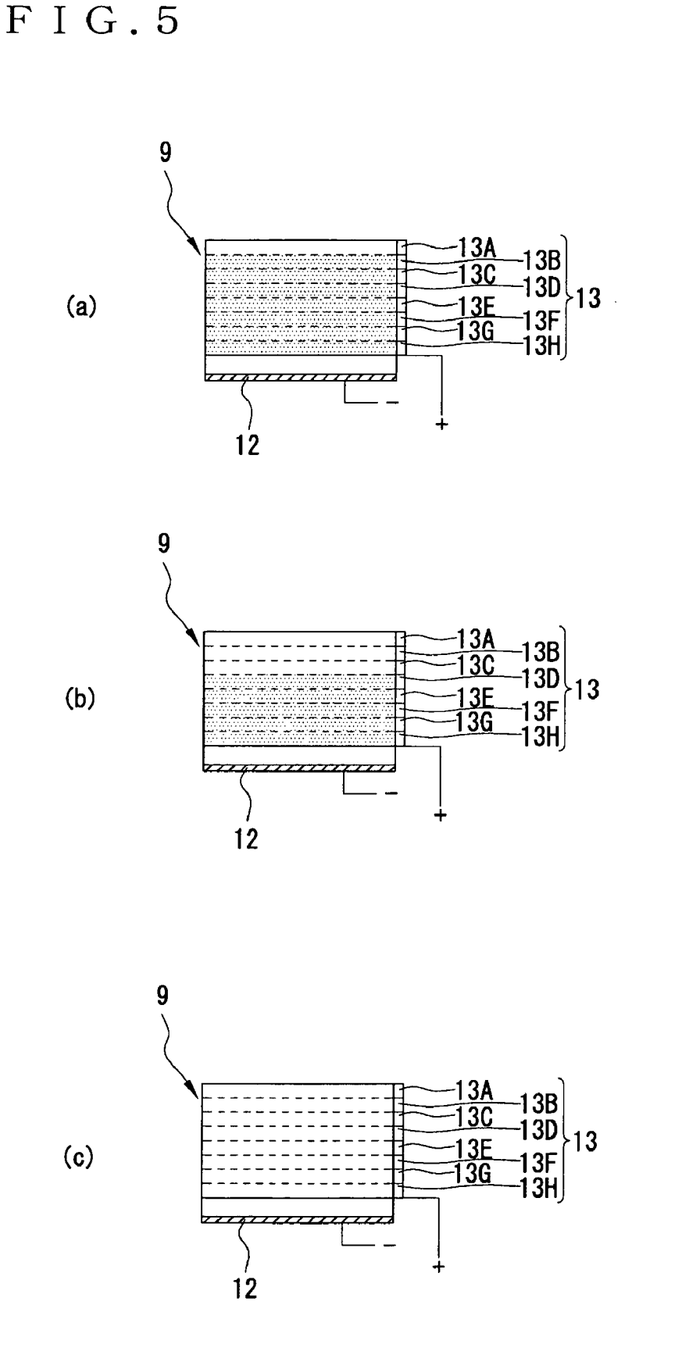
FIG. 5(a) shows the schematic as an example when individual segment of electronic blind is switched to clear transparent state on application of electric field.
FIG. 5(b) shows the schematic as an example when the plurality of the segments of electronic blind switched to clear transparent state on application of electric field.
FIG. 5(c) shows the schematic of electronic blind when all the segments are switched to clear transparent state on application of electric field.

FIG. 5(a) shows the schematic of an example of an individual segment of an electronic blind switched to a clear transparent state on application of an electric field. FIG. 5(b) shows the plurality of the segments of the electronic blind switched to the clear transparent state on application of the electric field. FIG. 5(c) shows the schematic of an example of the electronic blind when all the segments are switched to the clear transparent state on application of the electric field.

An AC electric field of 60 Hz and 30V is applied across the composite layer through coupling the voltage source across contact electrodes 12 and an individual segment electrode 13A (out of 13A to 13H). The individual segment across 13A becomes transparent where as other segments remains milky white as shown in FIG. 5(a). Similarly, an electric field is applied across the composite layer through coupling the voltage source across contacting electrodes 12 and a plurality of electrode segments such as 13A to 13C.

The segments across 13A to 13C become transparent, whereas other segments remain milky white as shown in FIG. 5(b).

Next, an electric field is applied across the composite layer through coupling the voltage source across contacting electrodes 12 and an all the electrode segments 13A to 13H. As a result, the whole electronic blind becomes totally transparent.

Since, an electronic blind disclosed in this invention has one substrate's patterned electrode from one side of the substrate to the other side of substrate in line form, voltage can be applied to individual segments. Thus, light control management is possible by controlling the transparency or opaque state of partial or over whole all area. Also, since one substrate has a patterned electrode and another substrate has a uniform electrode, there is no need to fine adjust the opposite facing electrodes to configure the electronic blind.

According to the electronic blind as disclosed in the present invention, light could be controlled over not only whole area, but selective partial area also. Thus, the electronic blind could be used as for a window of a building and automobiles in place of an existing blind. For example, in a hospital, a patient can see the sky outside when desired by remote switching the upper segment of the electronic blind to clear state. Furthermore, for automotive application such as a car or bus, one can enjoy the scenery outside without glare even in sunny day, while keeping ones privacy, by making half of a lower portion of a rear side window opaque with no applied voltage.

Furthermore, while being in a meeting room etc., one can control the electronic blind through remote control and could control it as of opening and closing of a blind or curtain without approaching near by.

Furthermore, the 1st film substrate has a copper foil electrode across from the 2nd film substrate that has connective electrodes over the ITO layer in relay form. By applying the electric voltage across the corresponding ITO layer segments, individual segment or whole are can be controlled.

The invention claimed is:

1. An electronic blind, comprising:
  a pair of substrates including a first substrate and a second substrate, said first and second substrates being film substrates;
  polymer/liquid crystal composite material interposed between said first and second substrates;
  a first electrode at the first substrate serving as a common electrode for the blind; and
  a plurality of second electrodes patterned onto a face of said second substrate in line form at intervals from one side to an other side of said face of said second substrate, each one of the plurality of second electrodes serving as an electrode for a corresponding line portion of the blind, said each one of the plurality of second electrodes being individually controllable to determine a light passage state for said corresponding line portion, wherein the light passage state for one segment of the blind differs from the light passage state of another segment of the blind, wherein said one segment comprises at least one line portion and wherein said another segment comprises at least one other line portion.

2. The electronic blind according to claim 1, wherein said plurality of second electrodes are patterned at an interval spacing of 0.2 mm or less.

3. The electronic blind according to claim 1, wherein a viscosity of a liquid crystal material in the polymer/liquid crystal composite material is 50 to 250 mPa·s.

4. The electronic blind according to claim 1, wherein the polymer/liquid crystal composite material comprises a mixture of acrylate monomers and oligomer.

5. The electronic blind according to claim 1, wherein a ratio of liquid crystal is 70 to 82 weight % and a pre-polymer ratio is 30 to 18 weight % in the polymer/liquid crystal composite material.

6. The electronic blind according to claim 1, wherein said film substrates are selected from the group consisting of polyethylene terephthalate film, polyethylene naphthalate film and polycarbonate film.

7. The electronic blind according to claim 1, wherein a boundary of the pair of substrates is sealed using sealing material to prevent entry of oxygen and/or moisture.

8. The electronic blind of claim 1, wherein the first electrode is formed over an entire face of the first substrate.

9. The electronic blind of claim 1, wherein the plurality of second electrodes are patterned directly onto said face of said second substrate.

10. An electronic blind providing light control management of a window, the blind comprising:
  a pair of substrates including a first substrate and a second substrate, said first and second substrates being film substrates;
  polymer/liquid crystal composite material interposed between said first and second substrates;
  a first electrode formed onto a face of said first substrate and serving as a common electrode for the entire blind; and
  a plurality of individually-controllable second electrodes patterned onto a face of said second substrate in line form at intervals from one side to another side of said face of said second substrate, each one of the plurality of second electrodes serving as an electrode for a corresponding line portion of the blind, said each one of the plurality of second electrodes being individually controllable to determine a light transmittance state for said corresponding line portion to enable light control management of said window.

11. The electronic blind of claim 10, wherein the blind includes one segment formed by at least one line portion that is adapted to a first light transmittance state, and another segment formed by at least one other line portion that is adapted to a second light transmittance state different from the first light transmittance state.

12. The electronic blind of claim 10, wherein the plurality of second electrodes are patterned directly onto said face of said second substrate.

* * * * *